United States Patent
Li et al.

(10) Patent No.: US 11,926,530 B2
(45) Date of Patent: Mar. 12, 2024

(54) METHOD FOR SYNTHESIZING SUPPORTED MOLECULAR SIEVE MEMBRANE BY MICROWAVES

(71) Applicant: Zhejiang Hymater New Materials Co., Ltd, Zhejiang (CN)

(72) Inventors: Yanshuo Li, Zhejiang (CN); Chen Chen, Zhejiang (CN); Dapeng Wu, Zhejiang (CN)

(73) Assignee: Zhejiang Hymater New Materials Co., Ltd, Zhejiang (CN)

( * ) Notice: Subject to any disclaimer, the term of this patent is extended or adjusted under 35 U.S.C. 154(b) by 248 days.

(21) Appl. No.: 17/414,182

(22) PCT Filed: Sep. 9, 2019

(86) PCT No.: PCT/CN2019/104962
§ 371 (c)(1),
(2) Date: Jun. 15, 2021

(87) PCT Pub. No.: WO2020/125075
PCT Pub. Date: Jun. 25, 2020

(65) Prior Publication Data
US 2022/0024774 A1     Jan. 27, 2022

(30) Foreign Application Priority Data
Dec. 16, 2018 (CN) .......................... 201811538507.7

(51) Int. Cl.
*C01B 39/46* (2006.01)
*B01D 61/36* (2006.01)
(Continued)

(52) U.S. Cl.
CPC ............ *C01B 39/46* (2013.01); *B01D 61/362* (2013.01); *B01D 67/0083* (2013.01);
(Continued)

(58) Field of Classification Search
CPC .............. B01D 67/0051; B01D 71/028; B01D 2323/14
See application file for complete search history.

(56) References Cited

U.S. PATENT DOCUMENTS

| | | | |
|---|---|---|---|
| 2003/0147805 A1* | 8/2003 | Koegler | .................. C01B 39/24 423/700 |
| 2009/0130000 A1* | 5/2009 | Inoue | ................... B01J 19/2475 422/600 |
| 2018/0015420 A1 | 1/2018 | Curulla-Ferre et al. | |

FOREIGN PATENT DOCUMENTS

| | | |
|---|---|---|
| CN | 1267566 A | 9/2000 |
| CN | 1128004 C | 11/2003 |

(Continued)

OTHER PUBLICATIONS

Rosemarie Szostak, Molecular Sieves Principles of Synthesis and Identification (Year: 1989).*
(Continued)

*Primary Examiner* — Alex A Rolland
(74) *Attorney, Agent, or Firm* — NKL Law; Allen Xue

(57) ABSTRACT

A method for synthesizing a supported molecular sieve membrane by microwaves includes the steps of aging, heating and synthesizing. The aging step is to make a support in contact with a synthetic liquid at 25° C. to 70° C. for 10 hours to 24 hours; the heating step is to raise a temperature of an aged system from an aging temperature to a synthesis temperature within 1 minute to 10 minutes; and the synthesizing step is to synthesize at 80° C. to 120° C. for 2 minutes to 15 minutes. The steps of heating and synthesizing are powered by microwaves.

3 Claims, 2 Drawing Sheets

(51) Int. Cl.
*B01D 67/00* (2006.01)
*B01D 69/10* (2006.01)
*C01B 39/16* (2006.01)
*C01B 39/20* (2006.01)
*C02F 1/44* (2023.01)
*C02F 101/34* (2006.01)

(52) U.S. Cl.
CPC ............ *B01D 69/108* (2022.08); *C01B 39/16* (2013.01); *C01B 39/20* (2013.01); *C02F 1/448* (2013.01); *B01D 2323/08* (2013.01); *C01P 2002/72* (2013.01); *C01P 2004/03* (2013.01); *C02F 2101/34* (2013.01)

(56) References Cited

FOREIGN PATENT DOCUMENTS

| | | | | |
|---|---|---|---|---|
| CN | 1778677 | A | * | 5/2006 |
| CN | 1778677 | A | | 5/2006 |
| CN | 100337918 | C | | 9/2007 |
| CN | 101643218 | A | * | 2/2010 |
| CN | 109534853 | A | | 3/2019 |
| JP | H08318141 | A | | 12/1996 |

OTHER PUBLICATIONS

Machine Translation of CN 101643218 A, no date.*
Machine Translation of CN 1778677 A, no date.*

* cited by examiner

METHOD FOR SYNTHESIZING SUPPORTED MOLECULAR SIEVE MEMBRANE BY MICROWAVES

TECHNICAL FIELD

The present invention belongs to the field of novel separation technologies, and particularly relates to a method for synthesizing a supported molecular sieve membrane by microwaves.

BACKGROUND

Since the end of last century, the synthesis of a molecular sieve membrane has always been one of the research hotspots in the academia and industry all over the world, and there are many related patents and literature reports. A plurality of methods, such as a pre-coated crystal seed secondary growth method and a gel synthesis method, have shown good application prospects in a laboratory research phase (JP08,318,141). However, these methods often need to face amplification problems such as a temperature gradient during heat transfer and sedimentation under an influence of gravity, leading to a serious decline in a quality of the synthesized molecular sieve membrane, such that it is difficult to implement large-scale production. This is also one of the reasons why it is difficult to industrialize the molecular sieve membrane after years of development.

Subsequently, the application of a microwave synthesis technology in a molecular sieve membrane synthesis method solves the amplification problems such as the temperature gradient during the heat transfer and the sedimentation under the influence of gravity. Meanwhile, due to an efficient microwave energy, a synthesis time is greatly shortened (CN 99112751.X). This further lays a foundation for the industrial synthesis and application of the molecular sieve membrane.

On this basis, CN100337918 further provides a method for synthesizing a molecular sieve membrane synthesized by in-site aging-microwaves. According to the method, a surface of a carrier does not need to be pre-coated with a crystal seed, the carrier is contacted with a synthetic liquid in advance at a temperature lower than a synthesis temperature, so that a pre-nuclei grow on the surface of the carrier before synthesis, and then a molecular sieve crystal grows on the pre-nuclei through energy supply by microwaves. According to the method, a crystal seed coating process is replaced with an in-situ aging process, which effectively simplifies a production process. However, a performance of the molecular sieve membrane produced by the method shows a strong instability within and between batches during actual industrial application. Taking the synthesis of a type-A molecular sieve membrane supported by a tubular alumina carrier as an example, a yield is often lower than 80%, and a top-grade rate of products is even lower than 45%. This brings an insurmountable cost problem to industrial production. It has become a bottleneck problem that limits the industrial application of the molecular sieve membrane.

SUMMARY

The present invention aims to, based on a method for preparing a molecular sieve membrane by in-situ aging-microwave synthesis, further provide an improved technology and an improved process, and strives to solve a problem of a poor product performance stability during synthesis, so as to further stably exert an application of a microwave function in the field of molecular sieve membrane synthesis, thus finally pushing the technology to the forefront of industrial application.

Therefore, the present invention firstly provides a method for synthesizing a supported molecular sieve membrane by microwaves, and the method is an improvement of an existing in-situ aging-microwave synthesis technology. The method for synthesizing the supported molecular sieve membrane by the microwaves according to the present invention includes the steps of aging, heating and synthesizing, wherein the aging is to make a support in contact with a synthetic liquid at 25° C. to 70° C. for 10 hours to 24 hours; the heating is to raise a temperature of an aged system from an aging temperature to a synthesis temperature within 1 minute to 10 minutes; and the synthesizing is to synthesize at 80° C. to 120° C. for 2 minutes to 15 minutes, wherein the steps of heating and synthesizing are powered by microwaves.

Compared with the prior art, methods of reducing an aging temperature, prolonging an aging time, and matching with delayed heating in a microwave synthesis phase are used in the technical solutions of the present invention, which effectively solve the problem of the poor product stability in the production process, greatly improve a pass rate of products and a top-grade rate of products, shorten a delivery period, greatly reduce time consumption in the microwave synthesis phase, and reduce energy consumption, thus further effectively reducing a production cost, resource consumption, and waste discharge. Therefore, the large-scale industrial application of a molecular sieve membrane separation technology has a practical operability.

DETAILED DESCRIPTION

Figure 1:
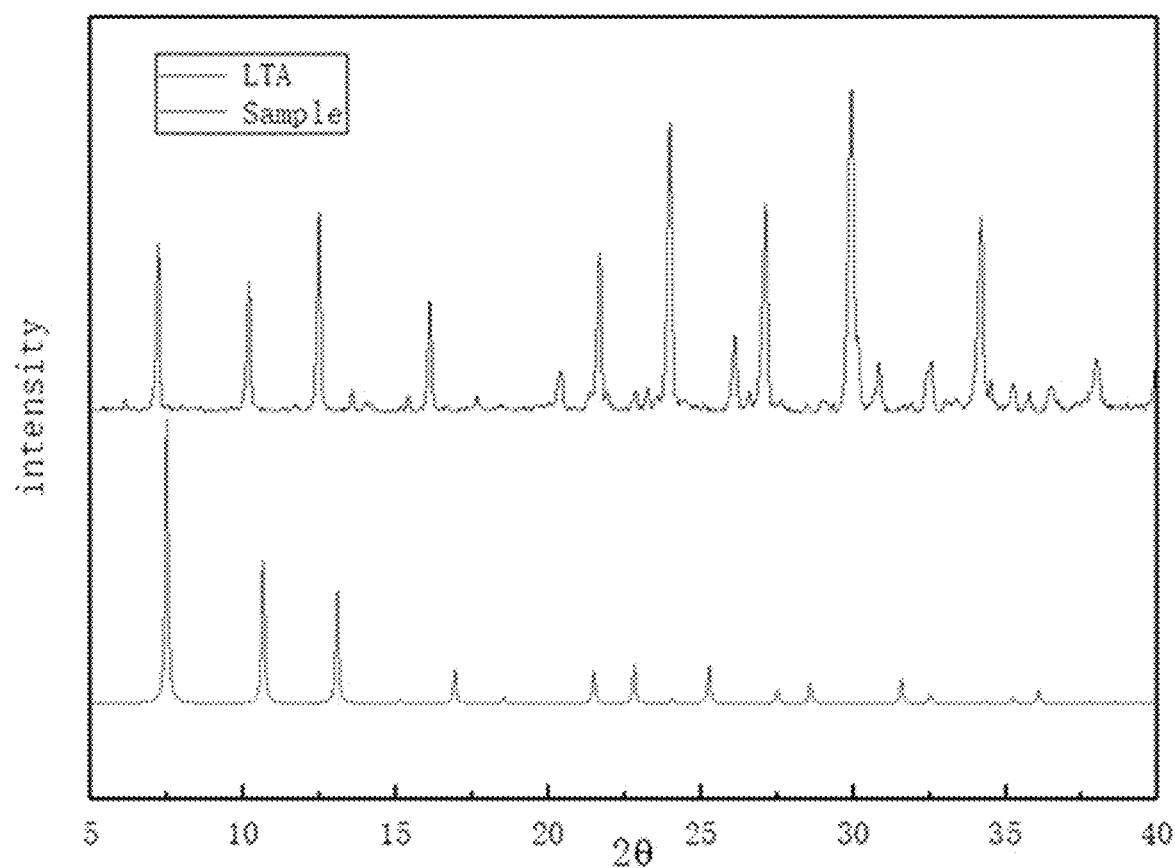
FIG. 1 is a pattern of X-ray diffraction detection results of a supported molecular sieve membrane product II.

The present invention provides a new method for synthesizing a supported molecular sieve membrane by microwaves, which includes the steps of aging, heating and synthesizing, wherein the aging is to make a support in contact with a synthetic liquid at 25° C. to 70° C. for 10 hours to 24 hours; the heating is to raise a temperature of an aged system from an aging temperature to a synthesis temperature within 1 minute to 10 minutes; and the synthesizing is to synthesize at 80° C. to 120° C. for 2 minutes to 15 minutes, wherein the steps of heating and synthesizing are powered by microwaves.

One technical feature of the present invention lies in sufficient and high-quality aging, which is one of the important technical means to reduce time consumption and energy consumption of microwave synthesis in the following steps. However, in the prior art, an aging time is generally no more than 10 hours, and a prolonged aging time may lead to a performance decline of a prepared membrane. In the specific embodiments of the present invention, long-term aging at a low temperature is employed, the aging temperature is preferably 25° C. to 50° C., and is more preferably 30° C. to 45° C. The aging time is preferably 12 hours to 20 hours, and is more preferably 16 hours to 20 hours. Lowering the aging temperature solves a problem of premature crystal growth caused by the prolonged aging time well, thus ensuring sufficient and high-quality aging.

Another important technical feature of the present invention lies in design of a microwave energy supply process. A technical solution of rapidly heating to a synthesis temperature is avoided from being used in the present invention, and a microwave operation part is divided into two continuous steps of heating and synthesizing. The heating is to raise a temperature of an aged system from the aging temperature to the synthesis temperature within 1 minute to 10 minutes, the heating is preferably completed within 2 minutes to 10 minutes, and is more preferably completed within 3 minutes to 6 minutes. The synthesizing is to synthesize at 80° C. to 120° C. for 2 minutes to 15 minutes, and in a preferred technical solution, the synthesizing lasts for 6 minutes to 10 minutes, and most preferably lasts for 7 minutes to 9 minutes.

In the field, a process from the aging to completion of the microwave synthesis is usually regarded as a round of synthesis operation, and completion of finished products usually requires two to three rounds of synthesis operations. A combination of the steps of aging, heating and synthesizing in the present invention is regarded as a round of operation. In practical application, the synthesis operation may be repeated once or twice, or the operation in the present invention may be combined with the synthesis operation in the prior art in application. The two ways may both obtain the technical effect in the present invention.

In a specific embodiment of the present invention, the support is a porous support. The support is preferably a support made of alumina, mullite, or cordierite. The support is most preferably the support made of alumina. A morphology of the support has no influence on the technical effect of the present invention, and a carrier morphology theoretically applicable to an existing microwave synthesis technology may be used in the technical solution of the present invention, and these carrier morphologies include but are not limited to a tubular carrier, a plate carrier, and a capillary carrier. In addition, since the technical solution of the present invention may bring a higher synthesis stability, the technical solution is expected to be expanded and applied to synthesis of a super-long and super-large carrier which cannot be applied in the prior art.

In another specific embodiment of the present invention, the synthetic liquid in the present invention contains 2 mol/L to 5 mol/L of $Na_2O$, 0.04 mol/L to 0.06 mol/L of $AL_2O_3$, and 0.2 mol/L to 0.6 mol/L of $SiO_2$ according to a molar ratio.

In a more specific embodiment, the technical solution of the present invention is particularly suitable for synthesis of the supported type-A molecular sieve membrane. In a synthesis test of the type-A molecular sieve membrane supported by the support made of alumina, according to a same product evaluation standard, the method of the present invention can improve a qualified rate of products to 98% and improve a top-grade rate of products to over 70%, thus greatly reducing a cost of technical application.

As a preferable embodiment, the present invention provides a synthesis method specifically applicable to the supported type-A molecular sieve membrane, and the method includes the following steps of ① using deionized water as a solvent to prepare the synthetic liquid, wherein the synthetic liquid contains 2 mol/L to 5 mol/L of $Na_2O$, 0.04 mol/L to 0.06 mol/L of $AL_2O_3$, and 0.2 mol/L to 0.6 mol/L of $SiO_2$ according to a molar ratio;

② aging: placing the tubular support made of alumina and the synthetic liquid in a reaction kettle, and then placing the reaction kettle in a microwave oven for synthesis to stand at 30° C. to 45° C. for 16 hours to 20 hours for sufficient aging;

③ heating: using the microwave oven to supply energy to slowly heat up to the synthesis temperature within 3 minutes to 6 minutes;

④ synthesizing: using the microwave oven to supply energy to synthesize at 80° C. to 120° C. for 7 minutes to 9 minutes;

⑤ washing and drying; and

⑥ repeating the above operations ① to ⑤ for two to three times.

The contents of the present invention are further explained hereinafter with reference to the specific embodiments, and these non-limiting embodiments should not be understood as limiting the present invention in any form. Unless otherwise specified, the materials and raw materials mentioned in the specification are all ordinary commercial products.

Refer to the following definitions for the testing and evaluation of synthesized supported molecular sieve membrane products.

1. Separation Factor

The separation factor indicates a ratio of relative contents of two substances in a material before and after a molecular sieve membrane separation operation, which is defined as:

$$\alpha_{i/j} = \frac{x_{i,p}}{x_{i,f}} \cdot \frac{x_{i,f}}{x_{j,p}}$$

where $\alpha_{i/j}$ represents a separation factor of a molecular sieve membrane to i (preferentially a permeable membrane) and j components; $x_{i,p}(x_{j,p})$ represents a mass fraction of the i(j) component in a permeate; and $x_{i,f}(x_{j,f})$ represents a mass fraction of the i(j) component in a raw material.

2. Permeation Flux

The permeation flux indicates a mass of a material penetrating through a unit membrane area in a unit time according to specified temperature and pressure, which is defined as:

$$J = \frac{W}{\Delta t A}$$

where J represents a permeation flux ($kgm^{-2}$ $h^{-1}$) W represents a mass of a permeation component (kg); $\Delta t$ represents a sampling interval time (h); and A represents an effective area ($m^2$) of a membrane surface for separation.

3. Dehydration Performance Test and Grading Standard of Molecular Sieve Membrane A raw material liquid is an ethanol solution containing 90% ethanol (mass fraction, the same below). When an operation temperature is 65° C., a permeation flux of pervaporation dehydration of the molecular sieve membrane is no less than 0.5 $kgm^{-2}$ $h^{-1}$, and a separation factor of a grade-A molecular sieve membrane (top-grade product) should be greater than 3,000, a separation factor of a grade-B molecular sieve membrane should be greater than 1,500, a separation factor of a grade-C molecular sieve membrane should be greater than 500, a separation factor of a grade-D molecular sieve membrane (qualified product) should be greater than 150, and a molecular sieve membrane with a separation factor less than 150 should be recorded as a grade-E molecular sieve membrane (unqualified product).

Embodiment 1

Preparation of LTA molecular sieve membrane product I included the following steps.

(1) A synthetic liquid I was prepared according to the following method.

Preparation of solution $A_1$: 15.0 g of NaOH was dissolved in 100 ml of deionized water, then added with 0.54 g of metal aluminum foil, and dissolved to obtain the solution $A_1$.

Solution $B_1$: 25.0 g of NaOH was dissolved in 75 ml of deionized water, then added with 10 ml of silica sol (containing 30% $SiO_2$), and dissolved to obtain the solution $B_1$.

The solution $A_1$ and the solution $B_1$ were completely mixed to obtain a uniform and clear synthetic liquid I. In the obtained synthetic liquid I, contained substances calculated according to a molar ratio were as follows: 50 moles of $Na_2O$: 1 mole of $Al_2O_3$: 5 moles of $SiO_2$: 1010 moles of $H_2O$. Corresponding converted molar concentrations were: 2.64 mol/L of $Na_2O$; 0.053 mol/L of $Al_2O_3$; and 0.263 mol/L of $SiO_2$.

(2) A tubular porous alumina ceramic support with a length of 10 cm and a diameter of 1.2 cm was supported with a bracket, and vertically placed in a polytetrafluoroethylene autoclave, and then the synthetic liquid was transferred into the autoclave. Before microwave synthesis, the autoclave was placed in an air oven at 45° C., so that the support was aged for 18 hours in presence of the synthetic liquid. After aging, the autoclave was placed in a microwave oven, and heated to 100° C. at a constant speed within 4 minutes. Then, a system temperature was maintained at 100° C., and a reaction was performed for 8 minutes. A synthesized molecular sieve membrane tube was washed and placed for drying.

(3) Operations of the above steps (1) to (2) were repeated once to obtain the supported molecular sieve membrane product I.

The supported molecular sieve membrane product I prepared in Embodiment 1 was subjected to a pervaporation separation performance test, and separation results of different alcohol/water systems at a permeation temperature of 65° C. were shown in Table 1.

TABLE 1

| System | Methanol/ water | Ethanol/ water | Isopropanol/ water |
|---|---|---|---|
| Concentration of raw material liquid (wt. %) | 90% | 90% | 90% |
| Separation factor | 5,000 | 10,000 | 10,000 |
| Permeation flux (g/m² · hr) | 860 | 1,250 | 1,500 |

It can be seen from Table 1 that the LTA molecular sieve membrane synthesized by the method has an excellent alcohol/water separation performance.

Embodiment 2

Preparation of LTA Molecular Sieve Membrane Product II (1) A synthetic liquid II was prepared according to the following method.

Preparation of solution $A_2$: 429 g of NaOH was dissolved in 2,000 ml of deionized water, then added with 42.3 g of sodium meta aluminate, and dissolved to obtain the solution $A_2$.

Preparation of solution $B_2$: 429 g of NaOH was dissolved in 2,000 ml of deionized water, then added with 343 g of sodium metasilicate nonahydrate, and dissolved to obtain the solution $B_2$.

The solution $A_2$ and the solution $B_2$ were completely mixed to obtain a uniform and clear synthetic liquid II. In the obtained synthetic liquid II, contained substances calculated according to a molar ratio were as follows: 51 moles of $Na_2O$: 1 mole of $Al_2O_3$: 5 moles of $SiO_2$: 1030 moles of $H_2O$. Corresponding molar concentrations were: 2.64 mol/L of $Na_2O$; 0.053 mol/L of $Al_2O_3$; and 0.263 mol/L of $SiO_2$.

(2) A tubular porous alumina ceramic support with a length of 1,030 mm and a diameter of 1.2 cm was supported with a bracket, and vertically placed in a polytetrafluoroethylene autoclave, and then the synthetic liquid was transferred into the autoclave. Before microwave synthesis, the autoclave was placed in an air oven at 45° C., so that the support was aged for 18 hours in presence of the synthetic liquid. After aging, the autoclave was placed in a microwave oven, and heated to 98° C. with controllable delay within 4 minutes. Then, a temperature was maintained at 98° C., and a reaction was performed for 8.5 minutes. A synthesized molecular sieve membrane tube was washed and placed for drying.

(3) Operations of the above steps (1) to (2) were repeated once to obtain the supported molecular sieve membrane product II, which was detected to be the LTA-type molecular sieve membrane.

Figure 2:
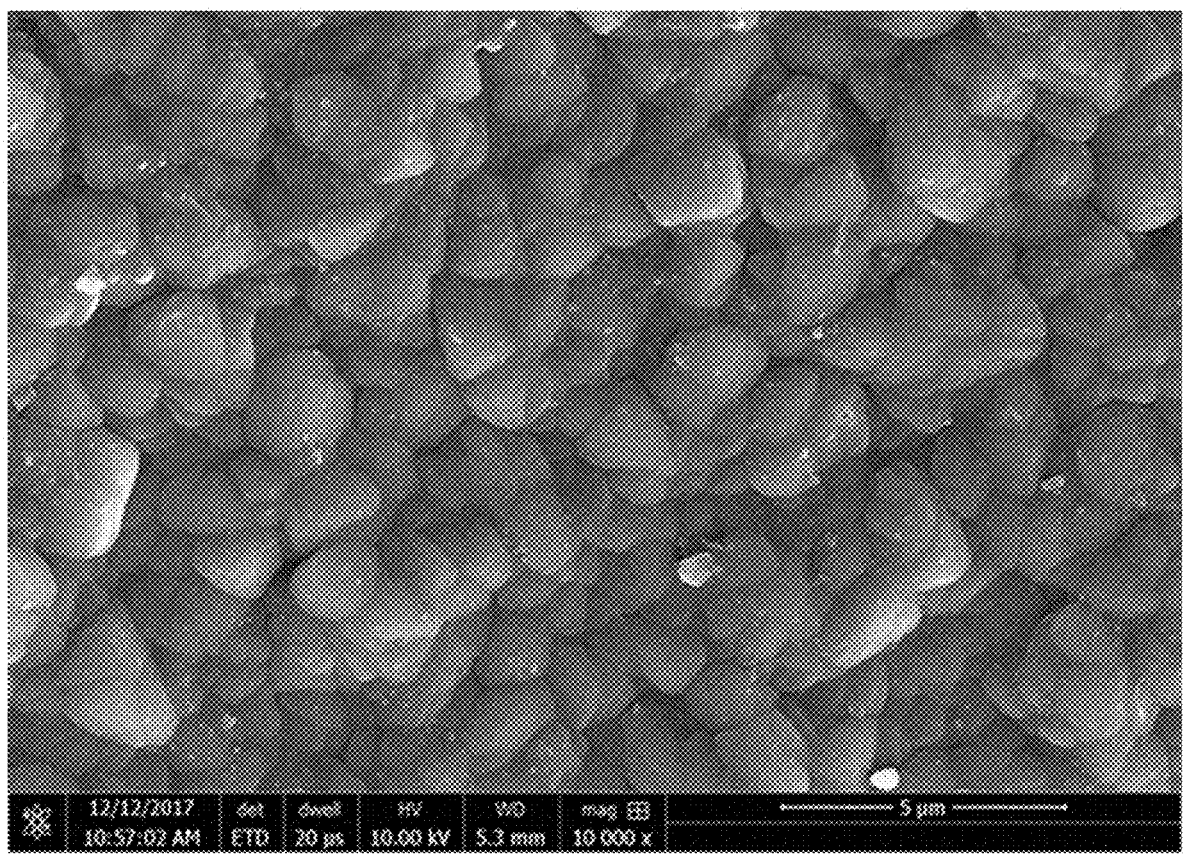
FIG. 2 is a scanning electron microscope photograph of the supported molecular sieve membrane product II.

An X-ray diffraction detection was performed on the prepared product II, and results were shown in FIG. 1, which proved that the product II prepared by the above method was the LTA molecular sieve membrane. A scanning electron microscope photograph of the product II was shown in FIG. 2, and it could be seen that a continuous and uniform molecular sieve membrane was formed on a surface of a base membrane.

Five LTA-type molecular sieve membranes in the same batch synthesized by the method in Embodiment 2 were respectively subjected to a pervaporation separation research, and a pervaporation separation performance of an ethanol/water system at a permeation temperature of 65° C. was shown in Table 2.

TABLE 2

| Serial number of membrane tube | Separation factor | Permeation flux (g/m² · hr) |
|---|---|---|
| 1 | 10,000 | 820 |
| 2 | 10,000 | 780 |
| 3 | 10,000 | 810 |
| 4 | 10,000 | 780 |
| 5 | 10,000 | 820 |

It can be seen from Table 2 that the long-tube LTA molecular sieve membrane synthesized by the method has an excellent alcohol/water separation performance and a good stability.

Embodiment 3

Preparation of FAU Molecular Sieve Membrane Product III (1) A synthetic liquid III was prepared according to the following method.

Solution $A_3$: 30.0 g of NaOH was dissolved in 220 ml of deionized water, then added with 0.675 g of metal aluminum foil, and dissolved to obtain the solution $A_3$.

Solution $B_3$: 40.0 g of NaOH was dissolved in 200 ml of deionized water, then added with 50 ml of silica sol (containing 30 wt % $SiO_2$), and dissolved to obtain the solution $B_3$.

The solution $A_3$ and the solution $B_3$ were completely mixed to obtain a uniform and clear synthetic liquid III. In the obtained synthetic liquid III, contained substances were calculated according to a molar ratio were as follows: 70 moles of $Na_2O$: 1 mole of $Al_2O_3$: 20 moles of $SiO_2$: 2020 moles of $H_2O$. Corresponding molar concentrations were: 1.94 mol/L of $Na_2O$; 0.028 mol/L of $Al_2O_3$; and 0.56 mol/L of $SiO_2$.

(2) A tubular porous alumina ceramic support with a length of 10 cm and a diameter of 1.2 cm was supported with a bracket, and vertically placed in a polytetrafluoroethylene autoclave, and then the synthetic liquid was transferred into the autoclave. Before microwave synthesis, the autoclave was placed in an air oven at 45° C., so that the support was aged for 20 hours in presence of the synthetic liquid. After aging, the autoclave was placed in a microwave oven, and heated to 102° C. with controllable delay within 6 minutes. Then, a temperature was maintained at 102° C., and a reaction was performed for 9 minutes. A synthesized molecular sieve membrane tube was washed and placed for drying.

(3) Operations of the above steps (1) to (2) were repeated once to obtain the supported molecular sieve membrane product III, which was detected to be the FAU-type molecular sieve membrane.

The prepared molecular sieve membrane product III was subjected to a pervaporation separation research, and separation results of different alcohol/water systems at a permeation temperature of 65° C. were shown in Table 3.

TABLE 3

| System | Ethanol/water | Isopropanol/water |
| --- | --- | --- |
| Concentration of raw material liquid (wt. %) | 90% | 90% |
| Separation factor | 10000 | 10000 |
| Permeation flux (g/m² · hr) | 1350 | 1600 |

It can be seen from Table 3 that the long-tube LTA molecular sieve membrane synthesized by the method has an excellent alcohol/water separation performance and a good stability.

Embodiment 4

Amplification synthesis and reproducibility experiment of LTA molecular sieve membrane synthesis A tubular support with a length of 1,030 mm was used, and a synthetic liquid was prepared according to the method in Embodiment 2 through proportional amplification. A total of 360 parallel experiments were performed in three batches (3 groups in each batch, and 40 tubes in each group). Experimental results were shown in Table 4. It can be seen from the results in Table 4 that under the experimental condition, a pass rate of each batch of products is 100%, and a top-grade rate of products is over 90%. A product quality has a good reproducibility within and between batches. The product is a product that meets needs of large-scale industrial production and application.

For comparison, a tubular support with a length of 1,030 mm was used, and parallel experiments of a batch of 120 molecular sieve membrane tubes (divided into 3 groups, with 40 tubes in each group) in total were performed according to the method in Embodiment 1 of CN100337918. Experimental results were shown in Table 5. It can be seen from the results in Table 5 that under the experimental condition, a pass rate of each batch of products is low, an average failure rate of products reaches up to 29.17%, and a top-grade rate of products fluctuates between 7.5% and 25%. A reproducibility among product quality groups is poor. Therefore, the product cannot meet needs of large-scale industrial production and application.

TABLE 4

| Group | Evaluation content | | A | B | C | D | E |
| --- | --- | --- | --- | --- | --- | --- | --- |
| First batch | Group 1-1 | Quantity | 39 | 1 | 0 | 0 | 0 |
| | | Proportion in group | 97.50% | 2.50% | 0.00% | 0.00% | 0.00% |
| | Group 1-2 | Quantity | 36 | 4 | 0 | 0 | 0 |
| | | Proportion in group | 90.00% | 10.00% | 0.00% | 0.00% | 0.00% |
| | Group 1-3 | Quantity | 35 | 5 | 0 | 0 | 0 |
| | | Proportion in group | 87.50% | 12.50% | 0.00% | 0.00% | 0.00% |
| | Total quantity in batch | | 110 | 10 | 0 | 0 | 0 |
| | Proportion in batch | | 91.67% | 8.33% | 0.00% | 0.00% | 0.00% |
| Second batch | Group 2-1 | Quantity | 40 | 0 | 0 | 0 | 0 |
| | | Proportion in group | 100.00% | 0.00% | 0.00% | 0.00% | 0.00% |
| | Group 2-2 | Quantity | 40 | 0 | 0 | 0 | 0 |
| | | Proportion in group | 100.00% | 0.00% | 0.00% | 0.00% | 0.00% |
| | Group 2-3 | Quantity | 37 | 3 | 0 | 0 | 0 |
| | | Proportion in group | 92.50% | 7.50% | 0.00% | 0.00% | 0.00% |
| | Total quantity in batch | | 117 | 3 | 0 | 0 | 0 |
| | Proportion in batch | | 97.50% | 2.50% | 0.00% | 0.00% | 0.00% |
| Third batch | Group 3-1 | Quantity | 37 | 3 | 0 | 0 | 0 |
| | | Proportion in group | 92.50% | 7.50% | 0.00% | 0.00% | 0.00% |
| | Group 3-2 | Quantity | 38 | 2 | 0 | 0 | 0 |
| | | Proportion in group | 95.00% | 5.00% | 0.00% | 0.00% | 0.00% |
| | Group 3-3 | Quantity | 38 | 2 | 0 | 0 | 0 |
| | | Proportion in group | 95.00% | 5.00% | 0.00% | 0.00% | 0.00% |
| | Total quantity in batch | | 113 | 7 | 0 | 0 | 0 |
| | Proportion in batch | | 94.17% | 5.83% | 0.00% | 0.00% | 0.00% |

TABLE 5

| Group | Evaluation content | | A | B | C | D | E |
| --- | --- | --- | --- | --- | --- | --- | --- |
| First batch | Group 4-1 | Quantity | 3 | 9 | 13 | 2 | 13 |
| | | Proportion in group | 7.50% | 22.50% | 32.50% | 5.00% | 32.50% |
| | Group 4-2 | Quantity | 10 | 6 | 9 | 3 | 12 |
| | | Proportion in group | 25.00% | 15.00% | 22.50% | 7.50% | 30.00% |
| | Group 4-3 | Quantity | 2 | 14 | 10 | 4 | 10 |
| | | Proportion in group | 5.00% | 35.00% | 25.00% | 10.00% | 25.00% |
| | Total quantity in batch | | 15 | 29 | 32 | 9 | 35 |
| | Proportion in batch | | 12.50% | 24.17% | 26.67% | 7.50% | 29.17% |

The invention claimed is:

1. A method for synthesizing a supported type-A molecular sieve membrane by microwaves, comprising the steps of aging, heating and synthesizing, wherein:
   the step of aging comprises contacting a support with a synthetic liquid at an aging temperature 25° C. to 50° C. for 16 hours to 20 hours to obtain an aged system;
   the step of heating comprises raising a temperature of the aged system from the aging temperature to a synthesis temperature within 3 minutes to 6 minutes under microwave heating;
   the step of synthesizing comprising synthesizing the aged system at the synthesis temperature of 80° C. to 120° C. for 6 minutes to 10 minutes under microwave heating, and
   the synthetic liquid contains 2.64 mol/L of $Na_2O$, 0.053 mol/L of $Al_2O_3$, and 0.263 mol/L of $SiO_2$.

2. The method according to claim 1, wherein the support has a porous structure.

3. The method according to claim 2, wherein the support is made of alumina, mullite, or cordierite.

* * * * *